A. SCHAEFFER.
PLANTER.
APPLICATION FILED JUNE 10, 1915.
1,169,055.
Patented Jan. 18, 1916.
4 SHEETS—SHEET 4.
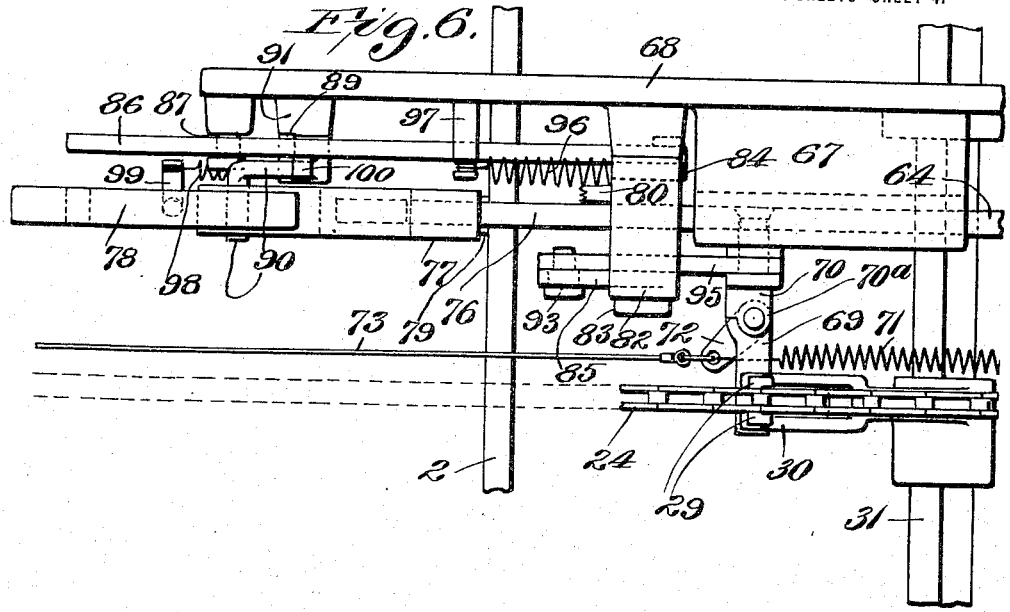
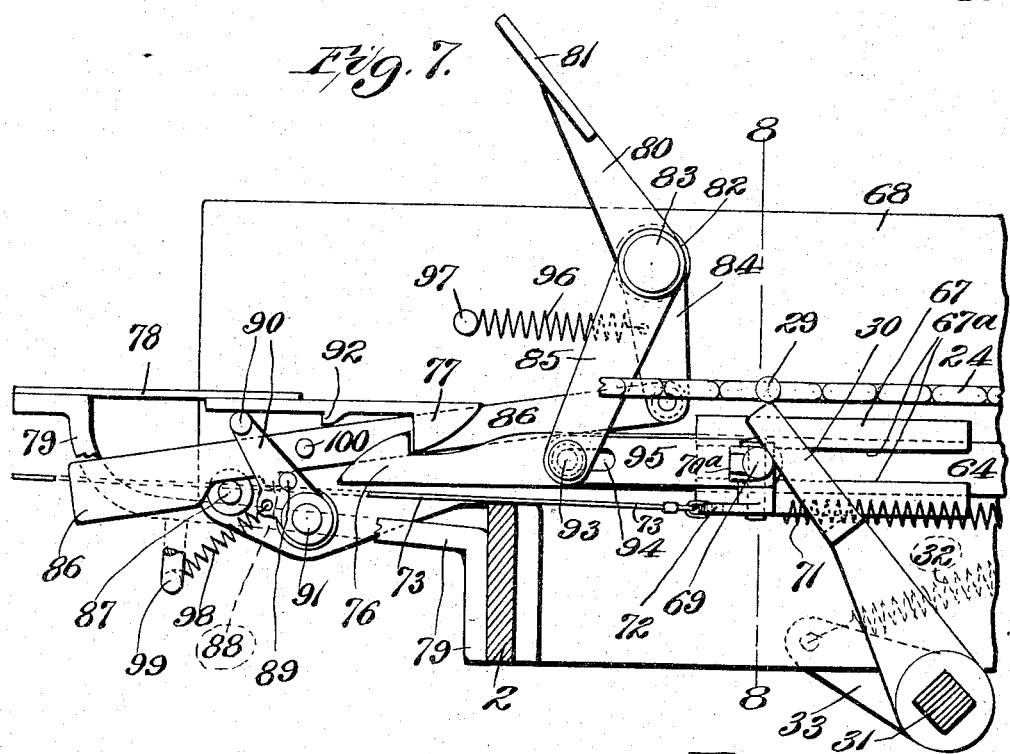
Inventor:
Alfred Schaeffer,
by Hugh H. Wagner,
his Attorney.
THE COLUMBIA PLANOGRAPH CO., WASHINGTON, D. C.

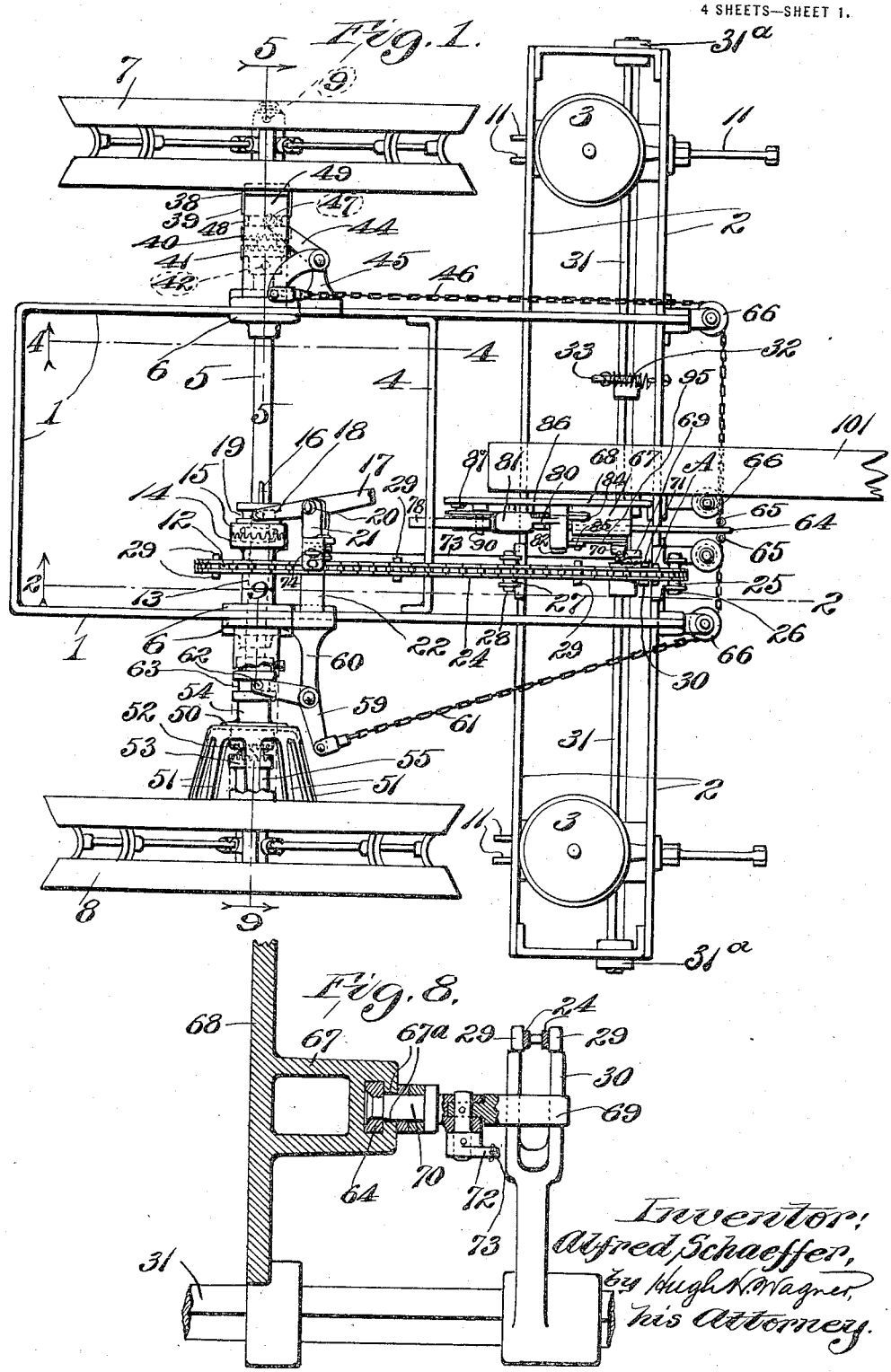

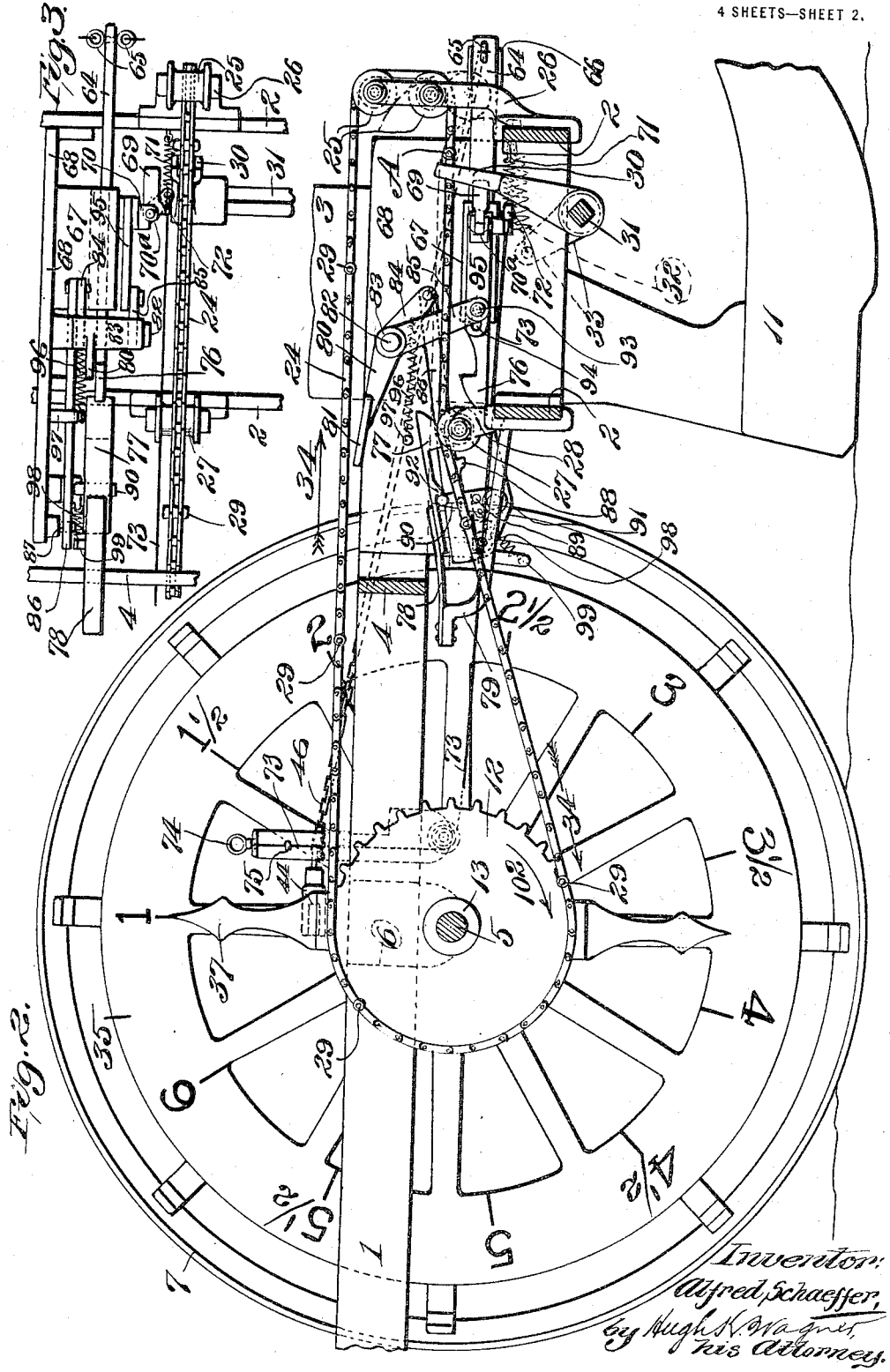

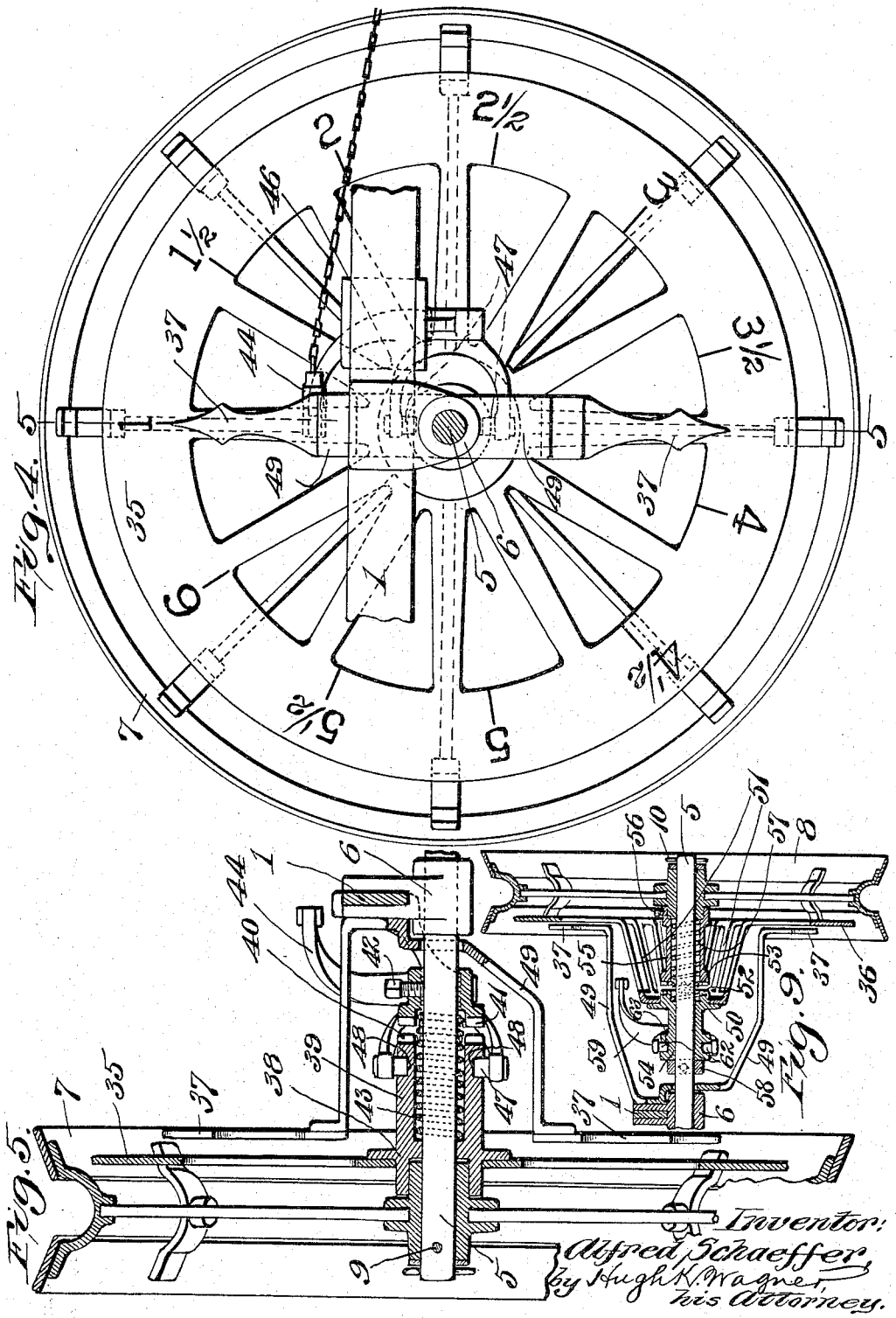

UNITED STATES PATENT OFFICE.

ALFRED SCHAEFFER, OF ST. LOUIS COUNTY, MISSOURI.

PLANTER.

1,169,055.  Specification of Letters Patent.  Patented Jan. 18, 1916.

Application filed June 10, 1915.  Serial No. 33,273.

*To all whom it may concern:*

Be it known that I, ALFRED SCHAEFFER, a citizen of the United States, residing in the county of St. Louis, State of Missouri, have invented certain new and useful Improvements in Planters, of which the following is a specification.

This invention relates to corn planters and the like and has for its object to provide simply and economically constructed means readily operated effectively, with which an ordinary planter may be equipped, whereby seed may be dropped automatically at regularly spaced intervals while the planter is being driven over a field to be planted, and whereby said dropping of seed may be interrupted while the planter is being driven over ground which it is desired not to plant, and, also, whereby the distance traveled by the planter while the dropping of seed is interrupted or at any other time may be measured and indicated to the driver for his guidance for any purpose.

A planter which drops seed by operating the valve of the seed box or seed boxes by means of mechanism that engages buttons or the like spaced apart upon one or more wires stretched along rows to be planted is inconvenient and expensive in operation because of the time and labor involved in stretching said wire or wires, and, also, is it expensive, not only, because of said time and labor so necessary, but, also, because of the comparatively great length of wire especially equipped for the purpose required for use in connection with a planter of this character. Moreover, the breaking of such check-row wires and their liability to become entangled in handling often causes great loss of time and adds to the expense and inconvenience of planting.

A planter equipped with an endless belt or chain with buttons or the like thereon at spaced intervals for operating the valve mechanism of the seed box or boxes so constructed that the operator cannot readily and quickly plant his field with the hills of parallel rows directly opposite each other is inconvenient, unsatisfactory, and impractical.

The planter embodying the present invention provides a simple and effective machine of comparatively cheap construction whereby the cumbersome, inconvenient, and expensive field check-row wire is eliminated and whereby all the mechanism for planting regularly spaced hills, the hills of each row being opposite a corresponding hill in a parallel row is part of the planter, and whereby the work may be performed economically, effectively, and accurately.

Moreover, the device embodying the present invention provides means whereby an ordinary planter may be equipped with mechanism carried upon and being part of the planter itself, whereby the planter may be operated to plant seed at regularly spaced intervals in a field of any shape or size and whereby each planted hill in a row is located opposite to a corresponding planted hill in a next adjacent parallel row.

Furthermore, in a planter embodying the present invention, the seed-dropping mechanism may be operated quickly or may be adjusted to remain inoperative while the planter is driven along over a field or other ground, and, also, the distance traveled by the planter while the seed-dropping mechanism is inoperative or operative may be measured and may be indicated to the operator for any purpose, such, for instance, as that hereinafter more particularly described.

Further, the present invention consists in the combination and arrangement of parts described in this specification and set forth in the claims.

In the accompanying drawings forming part of this specification wherein like numbers of reference denote like parts wherever they occur, Figure 1 is a plan view looking down upon a planter embodying the present invention, the mechanism being in position for dropping seed as the planter is driven over a field to be planted, the driver's seat, a part of an operating lever, and a portion of the hitching-shaft having been removed; Fig. 2 is a sectional view on the line 2—2, Fig. 1, looking toward the running wheel of the planter that is rigidly mounted on the axle; Fig. 3 is a fragmentary view showing a plan looking down upon part of the mechanism for moving the dial wheels into operative position to indicate the distance the planter is traveling; Fig. 4 is a sectional view on the line 4—4, Fig. 1, looking toward the running wheel of the planter that is rigidly borne by the axle; Fig. 5 is a sectional view on the line 5—5, Fig. 4, and, also, on the line 5—5, Fig. 1, on an enlarged scale, looking toward the forward part of the planter; Fig. 6 is a detailed plan view, on an enlarged scale, substantially the view depicted in Fig. 3, the mechanism being in position operatively to cause the dial wheels to indicate the distance the planter is traveling; Fig. 7 is a view showing a side elevation of Fig. 6; Fig. 8 is a sectional view on the line 8—8, Fig. 7, looking toward the forward part of the planter; and Fig. 9 is a sectional view on the line 9—9, Fig. 1, looking toward the forward part of the planter.

Body-frame 1 of any suitable construction, such, for instance, as that of the ordinary animal-drawn corn planter depicted in the accompanying drawings, may be provided with the usual cross-frame 2 borne by its forward portion, said cross-frame being adapted to support one or more seed-boxes 3 in any suitable manner, such, for instance, as that best seen in Fig. 1, adapted for the purpose of holding seed to be dropped therefrom for planting, as hereinafter more particularly described. Frame 1 may be provided with one or more cross members 4 or the like adapted for strengthening said frame or for any other purpose, and cross-frame 2 may be similarly strengthened by one or more transverse members (not shown in the drawings).

Frame 1 may be mounted on rotatable axle 5, said axle being rotatably supported in bearings 6 or the like, said bearings being rigidly secured to and borne by said frame. A running wheel 7 may be rigidly mounted at one end of said axle 5 so that said wheel 7 will at all times rotate as said axle is rotated, and a second running wheel 8 may be loosely mounted at the other end of said axle so that said wheel 8 may rotate independently of the rotation of said axle. The means for rigidly mounting said running wheel 7 upon said axle may be a pin 9 or any other suitable device adapted for rigidly securing said wheel upon said axle, and for holding said loosely mounted wheel 8 upon said axle and to prevent said wheel from slipping off from said axle one or more cotter pins 10 or the like may be provided, as best seen in Fig. 9. The peripheral face of each wheel 7 and 8 corresponding to the tire of a wheel of ordinary construction may be substantially convex on a curve from edge to edge of said face to form a substantially arch-shaped groove to a level surface over which the wheels may travel. This construction of the wheels is best seen in Figs. 1, 5, and 9, said wheels being mounted on axle 5 in a position directly in the path of and somewhat to the rear of shoes 11, which shoes may be of any usual construction provided on corn planters for the purpose of receiving seed dropped therethrough to the ground from seed boxes 3, as the valves of said seed boxes are opened as hereinafter described, said arched peripheral face of said wheels being the construction of the running wheels of corn planters of the ordinary construction so made and located as described, for a well known purpose.

A sprocket-wheel 12 may be loosely mounted on axle 5 by means of a hub 13 axially borne rigidly by said sprocket wheel, said hub having one end secured to an adjacent portion of frame 1 or otherwise held in rigid relation to rotatable axle 5, said axle being adapted to extend through said hub rotatably, the other end of said hub being provided with means adapted to form a clutch member 14, which movable clutch member 15 is adapted releasably to engage, as hereinafter more particularly described. Movable clutch member 15 may be substantially a sleeve, as shown in Fig. 1, so mounted on axle 5 that said member will rotate as said axle rotates, but which is adapted to be slidable longitudinally of said axle toward and away from clutch member 14, said slidable mounting being of any suitable construction, such, for instance as that shown in Fig. 1, whereby a male member (not shown) borne by the inner wall of said sleeve slidably engages an elongated groove 16 of a suitable length formed in axle 5 along its length.

A lever 17 may be provided for operating said movable clutch member slidably in groove 16 to engage clutch member 14, the lode-end 18 of said lever being preferably bifurcated to form a jaw adapted slidably to engage opposite sides of said movable clutch member in an appropriate groove 19 borne by the outer wall of said member so that said movable clutch member may rotate freely as said axle 5 is rotated, and, if desired, the terminals of said bifurcated end may be provided with anti-friction rollers or the like (not shown) to facilitate the free rotation of said movable clutch member 15, and said lever 17 may be pivotally fulcrumed at 20 to one end of a link 21, the other end of said link being pivotally attached to one end of a member 22, adapted to extend toward said link from an adjacent portion of frame 1 to which frame the other end of said member 22 may be rigidly secured. Said lever 17 may extend onwardly from fulcrum 17 for any suitable distance to provide a power-end (not shown) within convenient reach of the seat (not shown) of the operator so that he may apply power to said power end for releasably engaging said movable clutch member 15 with said clutch 14, rigidly associated with said sprocket wheel 12, whereby said sprocket wheel may be caused to rotate with axle 5 and clutch member 15 for the purpose hereinafter more particularly described. Means (not shown) of any suitable and well known construction may, if desired, be provided whereby said lever may be held in adjusted positions with said clutches in or out of engagement with each other.

An endless chain 24 or the like may be provided adjusted in operative association with sprocket wheel 12 and may extend forwardly over a pair of rollers 25 supported one above the other on an upright bracket 26, said bracket being borne by an adjacent portion of cross-frame 2, as best seen in Fig. 2, and a third roller 27 may be provided supported by bracket 28 borne by an adjacent portion of said cross-frame 2, said third roller being adapted to maintain that portion of chain 24 substantially horizontal between lower roller 26 and third roller 27, said third roller being somewhat to the rear of the valves of seed-boxes 3. Chain 24 may be provided along its length with a plurality of buttons or projections 29, said buttons being spaced apart at a predetermined distance from each other and being adapted to engage the free end of trigger 30, which free end may be bifurcated and adapted to admit said chain between said bifurcation, as shown in the drawings. The other end of said trigger may be rigidly borne by rock-shaft 31, which is adapted to extend across cross-frame 2 below seed-boxes 3 and is rotatably supported in bearings 32ª or the like borne by said cross-frame, said rock-shaft being provided with the usual mechanism (not shown) adapted to coöperate with the valve mechanism (not shown) to open and close the seed-box valves to permit a predetermined quantity of seed to drop from said seed-boxes 3 into shoes 11 thence upon the ground for planting as said rock-shaft is rocked in its bearings by means of buttons 29 engaging trigger 30. Normally, said rock-shaft is held in position to close the seed-box valves by means of spring 32 or the like, which spring may have one end secured to cross-frame 2 and the other end secured to one end of an arm 33, the other end of said arm being rigidly borne by rock-shaft 31, the arrangement of parts being such that rock-shaft 31 may be constantly under pressure of the pull of said spring 32 to tend to close said seed-box valves and, also, to tend to draw trigger 30 forwardly, so that, when chain 24 traveling normally in the direction of arrows 34 (Fig. 2) while the corn-planter is driven in a forward direction, and clutch members 14 and 15 are in engagement with each other, presents each button 29 successively to said trigger so that it strikes said trigger and engages therewith, causing said trigger to move from the position best seen in Fig. 2 to the position best seen in Fig. 7, rock-shaft 31 will be rocked to operate the seed-box valves to open position, and, as said trigger in moving from the position shown in Fig. 2 to the position shown in Fig. 7, describes an arc with its free end, and as buttons 29 travel in a horizontal direction adjacent said trigger, it will escape from engagement with a passing button 29, whereupon spring 32 will draw trigger 30 back to initial position, Fig. 2, rocking said rock-shaft to position adapted to close said seed-box valves, and as each button 29 successively engages and passes out of engagement with said trigger, the operation of opening and closing said seed-box valves will be repeated.

When it is desired to drive the corn planter along without operating the seed-box valves, lever 17 may be operated to release clutch member 15 from engagement with clutch member 14, whereupon sprocket wheel 12 will remain stationary, as will also chain 24, and no buttons 29 then coming in contact with trigger 30, the seed-valve opening and closing mechanism will cease to be intermittently operated and said valves will remain closed under the tension of spring 32 exerted upon rock-shaft 31.

A dial-wheel 35 may be provided mounted adjacent the inner side of rigidly mounted running wheels 7 and another dial-wheel 36 may be provided mounted adjacent the inner side of loosely mounted running wheel 8, and rigidly mounted in front of each of said dial-wheels a double headed arrow-indicator 37 may be provided, said indicators being rigidly secured to an adjacent part of frame 1 or to some other immovable part of the corn planter so that the pointers of said indicators will constantly stand in one position, such, for instance, as the vertical position shown in the drawings. Each of dial-wheels 35 and 36 may bear a clear circular scale upon a space adjacent its periphery, said scale being adapted to pass the pointers of said indicator as said dial-wheel is rotated, as hereinafter described, to indicate the distance a running wheel associated with said dial wheel is traveling as the planter is driven along the ground. A convenient scale for the purpose is the one shown in the drawings, wherein when a dial-wheel rotates so that the scale moved from the number 1 to the number 1½, Figs. 2 and 4, running wheel 7 will have traveled on its rim substantially a distance of 6 inches over the ground, and, continuing to revolve, said wheel will travel 6 inches as each successive number on said scale is rotated to a position adjacent a pointer of said indicator 37, and when said scale has rotated, for instance, from the number 1 back again to number 1, running wheel 7 will have traveled 6¼ feet over the ground. Dial-wheel 36 and its scale with the indicator associated therewith will in a similar manner indicate the distance running wheel 8 travels.

Dial-wheel 35 is provided with a hub 38 by which said dial-wheel is rigidly borne, which hub is loosely mounted on axle 5, said hub having a sleeve extension 39, through which sleeve extension and hub, axle 5 is adapted to extend rotatably, said hub and sleeve extension being slidable longitudinal of said axle as hereinafter more particularly explained. A clutch 40 may be provided borne by an end of said sleeve extension and a companion clutch 41 may be rigidly secured to axle 5 opposite clutch 40, the means for securing clutch 1 rigidly to axle 5 being of any suitable construction, such, for instance as that shown in the drawings, Fig. 5, wherein a screw 42 is adapted to hold said clutch 41 rigidly in place. Normally, clutch 40 is held out of engagement with clutch 41 by means of spring 43 or the like, which spring being seated at one end in an appropriate seat hollowed out in clutch 42 and being seated at the other end in a seat within sleeve extension 39, exerts pressure to push clutch 40 away from engagement with clutch 41, as best seen in Fig. 5.

Bell-crank 44 may be provided pivotally mounted on an end of bracket 45, the other end of said bracket being rigidly borne by frame 1. One arm of said bell-crank may be secured to one end of a chain 46, and the other arm of said bell-crank may be bifurcated, as best seen in Figs. 4 and 5, and adapted to form jaws 47, which jaws are adapted to seat slidably in a groove 48 borne by sleeve extension 39 adjacent clutch 40, so that said sleeve extension may rotate when clutch 40 is in engagement with clutch 41. Jaws 48 may be provided with terminal anti-friction rollers or the like (not shown) to facilitate the free rotation of said sleeve extension 39 when clutches 40 and 41 are in engagement with each other.

When the arm of bell-crank 44 attached to chain 46 is manipulated by pulling forwardly on said chain, said bell-crank will rock upon its pivotal bearing, and the other arm, bearing jaws 47, will draw sleeve extension 39 with clutch 40 toward and into engagement with clutch 41 against the tension of spring 43, whereupon sleeve extension 39 and the parts associated therewith, including dial-wheel 35, will rotate as axle 5 rotates, for, as hereinabove described, clutch 41 is rigidly borne by said axle 5. Upon releasing the forward pull upon chain 46, bell-crank 44 will rock to move clutch 40 away from engagement with clutch 41 under tension of spring 43, whereupon dial-wheel 35 will cease to rotate with axle 5.

Indicator 37, as associated with dial-wheel 35 and as associated with dial-wheel 36, may be supported in fixed position, as hereinabove described, by means of a pair of braces 49 adapted to extend from a portion of the body of said indicator to frame 1 to which said braces may be secured by any suitable means, a suitable construction and arrangement of said braces being best seen in Figs. 5 and 9.

In associating dial-wheel 36 with loosely mounted running wheel 8, the relative positions of the clutches associated therewith corresponding to clutches 40 and 41, are sustantially reversed as is readily discernible upon comparing Figs. 5 and 9, and upon comparing the parts adjacent to wheel 7, Fig. 1 with the parts adjacent to wheel 8, Fig. 1, which details of construction will now be set forth. Referring, therefore, to Fig. 9 and to the portion of Fig. 1 adjacent to running wheel 8, hub 50 of dial-wheel 36 is supported at a distance away from the scale-bearing portion of said dial-wheel by means of a plurality of members 51, which may be extensions of the spokes of said dial-wheel bent inwardly toward the adjacent portion of frame 1, said hub being sufficiently large to permit said extension to be supported spaced away a suitable distance from axle 5 and clutches 52 and 53, so as not to come in contact with said parts. Said hub 50 of dial-wheel 36 rigidly bears said dial-wheel and is loosely mounted on axle 5, a sleeve 54 borne by said hub 50 being adapted to extend from said hub in a direction toward frame 1, axle 5 being adapted to extend rotatably through said sleeve and said hub, and said sleeve and said hub with the parts borne thereby being slidable for a suitable distance along the length of said axle. Clutch 53 may be provided with a sleeve 55 adapted to extend from said clutch to the hub of loosely mounted running wheel 8, one end of said sleeve being rigidly mounted on said hub by any suitable means, such, for instance, as by means of screw 56, Fig. 9, clutch 53 being rigidly borne by the other end of said sleeve. The hollow portion of said sleeve is adapted to extend through the face of clutch 53, and is of sufficient diameter to permit axle 5 to extend therethrough to rotate freely therein without coming in contact with the inner walls of said hollow portion. Normally, clutch 52 is held out of engagement with clutch 53 by means of spring 57, which has one end seated in an appropriate seat in the hollow portion of said sleeve 55 and has its other end seated in an appropriate seat in sleeve 54, and the tension of said spring is exerted to push clutch 52 away from engagement with clutch 53, the movement of clutch 52 and sleeve 54 with the parts borne thereby in the direction away from said clutch 53 along axle 5 being limited by any suitable means, such, for instance, as by means of the stop-member 58 secured in an appropriate location on axle 5.

Bell-crank 59 may be provided pivotally borne by one end of a bracket 60, the other end of said bracket being rigidly borne by frame 1. One arm of said bell-crank may be secured to one end of chain 61, and the other arm of said bell-crank may be bifurcated similarly to the construction of the bifurcated arm of bell-crank 44, best seen in Figs. 4 and 5, said bifurcated arm being adapted to form jaws 62, which are adapted to seat slidably in groove 63 (similar to groove 48) borne by sleeve 54 of movable clutch 52, so that said sleeve and the parts rigidly borne thereby may rotate when said clutch 52 is pushed into engagement with clutch 53, said engagement of said clutches being accomplished by means of manipulating the arm of bell-crank 59 attached to chain 61. When bell-crank 59 is rocked by pulling forwardly on chain 61, clutch 52 will move toward and into engagement with clutch 53, whereupon dial wheel 36 will rotate as loosely mounted running wheel 8 rotates. Upon releasing the forward pull on chain 61, bell-crank 59 rocks in the reverse direction and clutch 52 moves away from engagement with clutch 53 under tension of spring 57, whereupon running wheel 8 may rotate without causing dial-wheel 36 to rotate.

Mechanism, hereinafter more particularly described, may be provided whereby chains 46 and 61 are both pulled forwardly simultaneously causing bell-cranks 44 and 59 to rock to bring clutch 40 into engagement with clutch 41 simultaneously with the bringing of clutch 52 into engagement with clutch 53, whereupon dial wheel 35 will rotate with axle 5 and its rigidly borne running wheel 7, while dial-wheel 36 will rotate with loosely mounted running wheel 8, said mechanism being adapted, also, to be operated to cause said bell cranks to rock to release said clutches simultaneously, whereupon said dial-wheels will simultaneously cease to rotate.

Describing now the mechanism referred to in the immediately preceding paragraph, chains 46 and 61 are brought forwardly to the forward part of the planter in front of cross-frame 2 and the forward ends of each of said chains are secured to the end-portion of slidable member 64, by any suitable means, such, for instance, as by means of eyelets 65 borne by said end-portion of said member, and each of said chains may be guided and supported along the course of their lengths by means of rollers 66 or the like borne upon the frame or cross-frame of the planter at any appropriate or convenient location, such, for instance, as shown in Fig. 1.

Slidable member 64 is slidably mounted in an appropriate slot or groove borne by guide-member 67, which guide-member is borne by supporting-plate 68, said plate being rigidly borne by and secured to adjacent portions of cross-frame 2.

A movable finger 69 has one end thereof attached to lug or pin 70 or the like by means of a rule-joint 70ª, said rule-joint being adapted to permit said finger to swing thereon forwardly substantially to the position shown in Figs. 1 and 3, and in the reverse direction to be swung into a position with its free end protruding substantially at a right angle to the path of movement of chain 24 and across the path of trigger 30 when said trigger is moved rearwardly from the position shown in Fig. 2 to the position shown in Fig. 7, said finger being normally held out of the path of the movement of said trigger by means of a spring 71 or the like, said spring having one end secured to an arm 72 rigidly borne adjacent the base of said finger, the other end of said spring being secured to a portion of cross-frame 2, as best seen in Fig. 3, so that the tension of said spring will constantly tend to pull said finger forwardly to the position shown in Figs. 1 and 3, there being, also, a wire rope 73 or the like provided having one end attached to said arm 72 and extending rearwardly therefrom to a convenient location on the planter to bring the other end accessible to the operator, said other end being provided with grasping means 74, Figs. 1 and 2, and one or more buttons 75 or the like adjacent the end bearing said grasping means, by means of which button or buttons engaging an appropriate notch or notches (not shown) or the like in or upon supporting projection 22 or the like, said wire rope 73 may be held in an adjusted position to hold finger 69 in the path of trigger 30 against the tension of spring 71, when said rope has been pulled rearwardly to throw said finger into said path in the position shown in Figs. 6, 7, and 8 for the purpose hereinafter more fully described. Pin 70 is rigidly borne by slidable member 64 and extends laterally therefrom through elongated lateral slot 67ª, said slot being adapted to communicate with the guide-slot of guide-member 67. A latch 76 may be provided borne by the rearward portion of said slidable member 64, said latch being adapted to engage a companion latch 77 when said slidable member has been drawn rearwardly to the position of parts shown in Figs. 6 and 7, said companion latch 77 being located somewhat to the rear of latch 76 with its catch slightly above and oppositely disposed to the catch of latch 76, said latch 77 being borne by a downwardly pressing leaf-spring 78 adapted to tend to press the catch of said latch 77 constantly downward, said leaf-spring having an end secured to a supporting frame or bracket 79, Fig. 7, which supporting bracket may be rigidly secured to and borne by an adjacent portion of cross-frame 2, as shown in the drawings.

Normally, latches 76 and 77 are disengaged and are in position relative to each other shown in Figs. 2 and 3, but when finger 69 has been pulled to a position to intrude across the path of movement of trigger 30 by means of manipulating rope 73, and when said trigger has been moved rearwardly from the position shown in Figs. 2 and 3 to the position shown in Figs. 6 and 7 by means of the pull of a button 29 on chain 24 engaging said trigger as said chain travels around sprocket-wheel 12, said latches 76 and 77 will be snapped into engagement with each other in the position shown in Figs. 6 and 7, and will be held in that position under the tension of leaf-spring 78, whereupon rope or wire 73 may be manipulated to restore finger 69 to its initial position Figs. 1 and 3, out of the path of movement of trigger 30. In order to release said latches 76 and 77 from engaged position, shown in said Figs. 6 and 7, mechanism may be provided comprising an operating lever 80 provided with a treadle 81 or the like accessible to the operator from the driver's seat (not shown) of the planter, said lever being pivotally borne at 82 by a pin 83 or the like borne by or made part of plate 68 and projecting therefrom. Extending downwardly from its pivotal support, lever 80 may be provided with two arms 84 and 85, the lower end of arm 84 being pivotally attached to the forward end of a movable plate 86, which plate is adapted to ride upon a pin 87 or the like borne by supporting plate 68. The rearward portion of said movable plate adjacent said pin may have a shank or shaft, as best shown in Fig. 7, and the lower edge of said movable plate may be provided with a lug or protuberance 88 adapted to engage a pin 89 borne by a lifting member 90, said member having one end pivotally supported on a pin 91, said pin being borne by supporting plate 68, and having its other end adapted to project upwardly against the under side of leaf-spring latch 77, as best seen in Fig. 7, said upper end being adapted slidably to engage said under side of said latch in moving forwardly from the position shown in Fig. 7 to the position shown in Fig. 2 and the reverse, said forward movement being limited by means of projection 92 borne by said under side of said leaf-spring latch. The upper end of said lifting member bearing upon said leaf-spring latch may be provided with a lateral extension, best shown in Fig. 6, adapted to extend substantially across the width of the under surface of said leaf-spring latch to provide a substantial bearing surface. The function of said lifting member is to lift leaf-spring latch 77 upwardly out of engagement with latch 76 when lever 80 is operated to draw plate 86 and said lifting member forwardly from the position shown in Fig. 7, and, also, to hold said leaf-spring latch normally in the position shown in Fig. 2. A more detailed description of the function and operation of said lifting member and the parts associated therewith is hereinafter set forth. The lower end of arm 85 of lever 80 bears a pin 93 slidably mounted in an elongated slot 94 borne by the rear end of plate 95, each end of which slot when in engagement with said pin forms substantially a pivotal bearing for the lower end of said arm 85, said plate 95 being adapted to extend forwardly to engage and push against lug 70 to move slidable member 64 forwardly to initial position, shown in Figs. 1, 2, and 3 when lever 80 is operated from the position shown in Fig. 7 to the position shown in Fig. 2, thus, also, restoring chains 46 and 61 to initial position shown in Fig. 1. Slot 94 is of a suitable length to permit the end of arm 85, bearing pin 93 slidably mounted in said slot, to move forward without pushing upon plate 95 during the initial movement of lever 80 wherein arm 84 is caused to perform its function of operating plate 86 to elevate lifting member 90 to release latch 77 from engagement with latch 76. After this function of arm 84 has been performed, the lower end of arm 85 will have traveled forwardly so that pin 93 borne thereby will push against the forward edge of slot 94 and then as power is further applied to lever 80, plate 95 will operate to push slidable member 64 forwardly to its initial position, Figs. 1, 2, and 3.

Spring 96 having one end attached to arm 84 and the other end attached to pin 97, which may be borne by supporting plate 68, and spring 98 having one end attached to lifting member 90 and the other end attached to pin 99, which may be borne by supporting bracket 79, serve, respectively, to facilitate the movement of said arm and said lifting member from their positions shown in Fig. 2 to their positions shown in Fig. 7, when slidable member 64 is moved rearwardly, and pin 100 borne by plate 86 may be provided further to facilitate said movement of lifting member 90 by being adapted to strike said lifting member as said plate moves rearwardly during the rearward movement of said slidable member 64.

Shaft 101, Fig. 1, may be provided for hitching animals to the planter for hauling same, but it is, of course, understood that the planter may, if desired, be driven by steam power or other power.

The planter embodying the present invention shown in the drawings is one equipped to plant two parallel rows simultaneously and it is a preferred manner of operating such a planter that the following description illustrates, but it is, of course, understood that, if desired, a planter embodying this invention may be equipped to plant only one row at a time, or it may be equipped to plant two or more rows simultaneously.

Normally, when a planter embodying the present invention is being operated to plant a field and is being driven in a forward direction for this purpose, the parts are in the position shown in Fig. 1, said position of some of the parts being shown more in detail in Figs. 2, 3, 5, and 9. In said position of parts, lever 17 is in position adapted to hold clutch 15 in engagement with clutch 14, whereby sprocket-wheel 12 is caused to rotate with axle 5 in the direction of curved arrow 102, Fig. 2, thus driving chain 24 borne by said sprocket-wheel in the direction of arrows 34, Fig. 2. As said chain travels in said direction a button 29 engages trigger 30 and draws said trigger rearwardly to the position shown in Fig. 7, which causes rock shaft 31 to rock in a direction adapted to open the valves of seed-boxes 3 permitting seed to drop therefrom into shoes 11 and hence to the ground. As a button 29 passes out of engagement with said trigger, said trigger is released and moves forwardly from the position shown in Fig. 7 to the position shown in Fig. 2, said movement causing rock shaft 31 to be rocked to close the valves of said seed-boxes. As each button 29 successively comes into and passes out of engagement with said trigger, rock-shaft 31 is rocked first to open and then to close said seed-box valves, said buttons 29 being spaced apart uniformly at a predetermined distance adjusted to the distance apart the hills are to be planted along the length of a row.

In the normal position of parts above referred to, when the planter is being operated to plant seed, the clutches 40 and 52 are out of engagement with clutches 41 and 53, respectively, and dial-wheels 35 and 36 will not rotate for the purposes of this invention, and chains 46 and 61 and wire or rope 73 are in the position shown in Fig. 1. Preferably, immediately after planting the next to the last hill at the end of each of a pair of rows along which the planter is being driven and when trigger 30 has moved forwardly to rock the rock-shaft 31 to close the valves of seed-boxes 3 after said trigger has been released from engagement with a passing button 29, the operator may grasp the grasp-end 74 of wire or rope 73 and may pull said rope or wire to swing finger 69 on its rule-joint 70ᵃ from the position shown in Figs. 1 and 3 to the position shown in Figs. 6 and 7, whereby said finger is caused to protrude across the path of movement of trigger 29. Thereupon, when the next button 29 on chain 24 engages trigger 30 to cause the last hill in each row to be planted, said trigger will engage said finger and will move said finger rearwardly thereby drawing slidable member 64 rearwardly, which will draw the ends of chains 46 and 61 attached to the forward end of said slidable member rearwardly, thus rocking bell-cranks 44 and 59, which will in turn simultaneously throw clutches 40 and 52 into engagement with clutches 41 and 53, and while said slidable member is so moving rearwardly, latch 76 borne by said slidable member 64 will move rearwardly to a position beneath the catch of latch 77, and plate 95, also, moving rearwardly as pin 70 moves rearwardly with said slidable member, arms 84 and 85 of lever 80 will be drawn rearwardly, moving plate 86 rearwardly, which will cause pin 100 to strike lifting member 90, moving said lifting member away from the position shown in Fig. 2, wherein it supports leaf-spring latch 77, to the position shown in Fig. 7, wherein said leaf-spring latch being released from the upward thrust of said lifting member will drop into engagement with latch 76 as shown in Fig. 7, springs 96 and springs 98 being adapted to facilitate said movement of said arms 84 and 85 and said lifting member. Now clutches 40 and 52 will be held in engagement with clutches 41 and 53, and, therefore, dial-wheels 35 and 36 will rotate with the rotation of rigidly mounted running wheel 7 and loosely mounted running wheel 8, respectively. Thereupon, and preferably when a button 29 is substantially in the position shown at A, Fig. 1, the operator may apply lever 17 to operate said lever to move clutch 15 out of engagement with clutch 14, whereupon sprocket wheel 12 will cease to rotate and chain 24 will become stationary, thus causing the mechanism for dropping seed to be adjusted to inoperative position. The mechanism, hereinabove described in detail, for throwing said clutches 40 and 52 into engagement with clutches 41 and 53, respectively, is so constructed and arranged that the interval of time between that of the dropping of seed in the last hill at the end of a pair of rows being planted is substantially negligible in practice, and, for all practical purposes, dial-wheels 35 and 36 will begin to rotate substantially at the time said last hill is planted, and the planter will then be in proper adjustment for being driven from the planted pair of rows to the location of the next adjoining pair of unplanted rows preparatory to planting said adjoining rows.

In a planter of the ordinary construction it is very difficult to achieve the desired result of beginning the planting of such an adjoining pair of rows so that the first dropping of seed in said adjoining rows will be in a hill or hills directly opposite to the last planted hills in the prior planted rows, and, therefore, an irregularly planted field is the result, which it is desirable to avoid in proper, efficient, and workmanlike farming practice.

The dial-wheels 35 and 36 provided in a planter of the present invention adjusted to rotatable position substantially at the time of planting the last hills at the end of a planted pair of rows, provides means for achieving the desired result of beginning the planting of the next adjoining pair of rows with the first hills thereof planted directly opposite the last hills planted at the end of the prior planted rows, the scale borne by said dial-wheel with indicators 37 being adapted to measure the distance that the planter travels in going from the last planted hills at the end of the completed pair of rows to the first hills at the beginning of the pair of rows to be planted.

Now, continuing the description of the operation of the planter embodying the present invention from the point when said dial-wheels have been adjusted to rotatable position with the seed dropping mechanism inoperative, as hereinabove described, and the last hills at the end of a pair of rows having been planted, the planter will now have been adjusted and is in position for being driven away from the planted rows preparatory to being turned and driven toward the new pair of rows. Immediately before the dial-wheels begin to rotate, the operator will observe the position of the scale thereon with reference to the indicator 37 associated therewith, and then driving directly forward on a line with the planted rows just completed for a convenient distance, which distance will be definitely measured and indicated by said scale as a dial-wheel rotates, whereupon immediately before turning substantially at a right-angle to the right or left to reach a point on a line with the new pair of rows to be planted, the operator will note by means of said scale and indicator the distance he has traveled directly away from the last hills planted, and then driving to the right or left, as the case may require, to a point in front of the new pair of rows to be planted, the operator will again turn the planter on substantially a turn of ninety degrees bringing the forward part of the machine in position to head directly toward said new pair of rows, and having completed this last turn, he will again observe said scale and indicator and will drive the planter forwardly toward the new pair of rows substantially an equal distance (which will be indicated by said scale and indicator as he proceeds) as that over which he drove the planter directly away from the last hills planted in the prior planted pair of rows, whereupon he may immediately operate lever 17 to throw clutch 15 into engagement with clutch 14, thereby causing sprocket-wheel 12 to rotate, which in turn will drive chain 24 to cause the seed-dropping mechanism to be adjusted to operative position, and, the movement of chain 24 having been stopped, as hereinabove described, after the last hills in the prior planted pair of rows was planted with a button 29 substantially in position immediately in front of trigger 30, as shown at A, in Fig. 1, said button will engage the trigger 30 and will rock the rock-shaft 31 to cause seed to be deposited in the first hill of each of said pair of new rows directly opposite the last hill planted in each of said two prior planted rows. The seed-planting mechanism will thereafter continue to cause seed to be dropped upon the ground in hills properly spaced apart until the operator adjusts same to inoperative position.

Preferably, at some time during the turning of the planter from a planted pair of rows to a new pair of rows to be planted, the operator may manipulate the grasp-end 74 of rope or wire 73 to release finger 69 from the pull of said rope or wire, whereupon said finger will, under tension of spring 71, swing back out of the way of the path of movement of trigger 30 and will resume its initial position shown in Figs. 1 and 3. At any time convenient after entering upon the new pair of rows, and after adjusting the seed-dropping mechanism to operative position, as hereinabove described, the operator may press downwardly upon treadle 81 of lever 80 to operate mechanism, hereinabove described in detail, to disengage latch 77 from latch 76, and to move forward slidable member 64, thereby to remove clutches 40 and 52 from engagement with clutches 41 and 53, respectively, whereupon dial-wheels 35 and 36 will cease to rotate, and the parts associated with the mechanism operated directly and indirectly by said lever will be restored to initial position shown in Fig. 1, all other parts having been restored to the adjusted position shown in said Fig. 1, as hereinabove described, in which position said mechanism and said parts may remain until occasion arises, such for instance, as that of reaching the end of rows being planted, for changing the adjustment of parts by means of the mechanism provided therefor.

A skilful operator will, with a little practice, readily be able to operate the various levers and the like to cause the mechanism of a planter embodying the present invention to perform its various functions timely and effectively, thus gaining the full advantages of the great saving in time and labor resulting from the use of the planter herein described, and even an unskilful or occasional operator will be able to obtain very satisfactory results in using this planter and can plant a field in workmanlike manner with comparatively little expenditure of effort and time. Moreover, in planting fields of irregular outline, or where it is desired to leave unfavorable plots unplanted, or the like, the use of a planter embodying the present invention has many advantages over other models of planters, not only because the seed-dropping mechanism may readily be placed in operative or inoperative adjustment, but, also, because by means of the scaled dial-wheels, whose adjustment into and out of operative position is so readily accomplished, distances may be measured as the planter is driven along, and because all the mechanism for performing the many functions hereinabove described are carried upon and about the planter itself and may be operated by means quickly accessible to the operator in the driver's seat.

Many changes in the arrangement and combination of parts may be made without departing from the nature and spirit of the present invention.

I claim:

1. A seed planter comprising a carriage frame, an axle rotatably mounted on said frame, a pair of running wheels mounted on said axle, means borne by said frame adapted to contain seed therein, valve-mechanism borne by said means, means adapted to be operated by said axle for intermittently operating said valve-mechanism, and means adapted releasably to hold said valve-operating means in operative position; in combination with mechanism borne by said frame adapted to measure the distance traveled by the planter, and means releasably holding the measuring mechanism in operative engagement with driven parts of the seed planting mechanism, said means including a movable member adapted releasably to engage a driven part of said seed-planting mechanism to throw said measuring mechanism into and out of operative engagement with the driven parts of said planter.

2. A seed planter comprising a carriage frame, an axle rotatably mounted on said frame, a pair of running wheels mounted on said axle, hollow means borne by said frame adapted to contain seed, valve-mechanism for said means, means adapted to be operated by said axle for intermittently operating said valve-mechanism, and means adapted releasably to hold said valve-operating means in operative engagement with said axle; in combination with mechanism borne by said frame adapted to measure the distance traveled by the planter, and means releasably holding the measuring mechanism in operative engagement with driven parts of the seed planting mechanism, said means including a movable member adapted releasably to engage a driven part of said seed-planting mechanism to throw said measuring mechanism into and out of operative engagement with the driven parts of said planter.

3. A seed planter comprising a carriage frame, an axle rotatably mounted on said frame, a driving wheel rigidly mounted on said axle, a running wheel loosely mounted on said axle, hollow means borne by said frame adapted to contain seed, valve-mechanism for said means adapted operatively to communicate with the interior of said means, means adapted to be operated by said axle for intermittently operating said valve-mechanism, said valve-operating means consisting of a sprocket wheel loosely mounted on said axle, an endless chain adapted to be driven by said sprocket wheel, said chain extending from said sprocket wheel to the forward portion of the seed planter, rotatable means borne by the forward portion of said frame adapted to support a portion of said chain, a plurality of spaced members protruding from said chain, a rock-shaft operatively connected with said valve-mechanism, a trigger rigidly borne by said rock-shaft, said spaced members being adapted successively to trip said trigger to rock said rock-shaft as said chain is driven by said sprocket wheel, and means adapted releasably to hold said sprocket wheel in rigid engagement with said axle; in combination with mechanism borne by said frame adapted to measure the distance traveled by the planter, and means releasably holding the measuring mechanism in operative engagement with driven parts of the seed planting mechanism, said means including a movable member adapted releasably to engage a driven part of said seed-planting mechanism to throw said measuring mechanism into and out of operative engagement with the driven parts of said planter.

4. In a seed planter comprising a carriage frame mounted on a rotatable axle, said axle having a running wheel rigidly mounted thereon adjacent one end and a running wheel loosely mounted thereon adjacent the other end, and hollow means borne by said frame adapted to contain seed, the combination with valve-mechanism adapted to communicate with the interior of said hollow means, of means adapted to operate said mechanism as the planter is driven along, said operating means consisting of a sprocket wheel loosely mounted on said axle, a clutch member rigidly borne by the hub of said sprocket wheel, a clutch member slidably mounted on said axle and adapted to be movable longitudinally of said axle into and out of engagement with said first-named clutch member, said slidable clutch member being rigidly mounted in relation to the axis of rotation of said axle, an endless belt adapted to be driven by said sprocket wheel, rotatable means borne adjacent the forward portion of said frame adapted to guide and support a looped portion of said belt, the other looped portion of said belt being borne by said sprocket wheel, a plurality of spaced members borne by said belt, a rock-shaft adapted to be operatively connected with said valve-mechanism, spring-pressed means adapted to coöperate with said rock-shaft to hold said valve mechanism normally in closed position, and means rigidly borne by said rock-shaft, said spaced member being adapted successively to trip said rigidly borne means as said belt is driven by said sprocket wheel to rock said shaft in one direction to open said valve-mechanism, said spring-pressed means being adapted, also, to rock said shaft in the reverse direction to restore said rigidly borne means and said valve-mechanism to initial position after each of said spaced members pass successively out of tripping engagement with said rigidly borne means; in combination with mechanism borne by said frame adapted to measure the distance traveled by the planter, and means releasably holding the measuring mechanism in operative engagement with driven parts of the seed planting mechanism, said means including a movable member adapted releasably to engage a driven part of said seed-planting mechanism to throw said measuring mechanism into and out of operative engagement with the driven parts of said planter.

5. In a seed planter having an axle rotatably mounted thereon, said axle having a carriage wheel rigidly mounted thereon adjacent one end and a carriage wheel loosely mounted thereon adjacent the other end, and hollow means borne by said planter adapted to contain seed, the combination with valve-mechanism adapted to communicate with the interior of said hollow means, of means adapted to operate said mechanism as the planter is driven along, said valve-operating mechanism consisting of a sprocket-wheel loosely mounted on said axle, a clutch member rigidly borne by said sprocket-wheel, a slidable clutch member adapted to be releasably engaged with said first-named clutch member, means borne by said slidable clutch member and means borne by said axle adapted coöperatively to engage each other to mount said slidable clutch member on said axle rigidly in relation to the axis of rotation of said axle, means adapted to slide said slidable clutch into and out of engagement with said first-named clutch member, an endless member adapted to have one looped portion borne by said sprocket-wheel and another looped portion extend toward the forward portion of the planter, rotatable means borne by the forward portion of the planter adapted to support said forward loop, rotatable means borne by said planter between said forward loop and said sprocket-wheel adapted to support a portion of said endless member in horizontal position, said endless member being adapted to be driven by said sprocket-wheel, a plurality of spaced members borne by said endless member, a rock-shaft adapted to be operatively connected with said valve-mechanism, spring-pressed means adapted to coöperate with said rock-shaft to hold said valve-mechanism normally in closed position, and means rigidly borne by said rock-shaft adapted to be tripped by each of said spaced members as said endless member is driven by said sprocket-wheel to rock said shaft in one direction to open said valve-mechanism, said spring-pressed means being adapted, also, to rock said shaft in the reverse direction to restore said rigidly borne means and said valve-mechanism to initial position after each of said spaced members pass successively out of tripping engagement with said rigidly borne means; in combination with mechanism borne by said frame adapted to measure the distance traveled by the planter, and means releasably holding the measuring mechanism in operative engagement with driven parts of the seed planting mechanism, said means including a movable member adapted releasably to engage a driven part of said seed-planting mechanism to throw said measuring mechanism into and out of operative engagement with the driven parts of said planter.

6. A seed planter comprising mechanism borne by said planter adapted automatically to plant seed at spaced intervals as said planter is driven along, means adapted releasably to hold said mechanism in operative engagement with driven parts of said planter, mechanism borne by said planter adapted automatically to measure the distance traveled as said planter is driven along, means adapted releasably to hold said measuring mechanism in operative engagement with driven parts of said planter, and mechanism operatively connected to said last-named means adapted to operate same, said mechanism including a movable member adapted releasably to engage a driven part of said seed-planting mechanism to move said measuring mechanism into operative engagement with said driven parts of said planter.

7. A seed planter comprising mechanism borne by said planter adapted automatically to plant seed at spaced intervals as said planter is driven along, means adapted releasably to hold said mechanism in operative engagement with driven parts of said planter, mechanism borne by said planter adapted automatically to measure the distance traveled as said planter is driven along, means adapted releasably to hold said measuring mechanism in operative engagement with driven parts of said planter, and mechanism operatively connected to said last-named means adapted to operate same, said mechanism including a movable member adapted releasably to engage a driven part of said seed-planting mechanism to move said measuring mechanism into operative engagement with said driven parts of said planter, spring-pressed means adapted normally to hold said movable member out of said engaging position, and means adapted for releasably moving and holding said member into engaging position, said spring-pressed means being, adapted, also, for restoring said member to normal position when said holding means is released.

8. A seed planter comprising mechanism borne by said planter adapted automatically to plant seed at spaced intervals as said planter is driven along, means adapted releasably to hold said mechanism in operative engagement with driven parts of said planter, mechanism borne by said planter adapted automatically to measure the distance traveled as said planter is driven along, means adapted releasably to hold said mechanism in operative engagement with driven parts of said planter, and mechanism operatively connected to said last-named means adapted to operate same, said mechanism including a movable member adapted releasably to engage a driven part of said seed-planting mechanism to move said measuring mechanism into operative engagement with said driven parts, and means adapted for restoring said last-named mechanism to initial position to disengage said measuring-mechanism from operative engagement with said driven parts.

9. A seed planter comprising mechanism adapted for automatically planting seed at spaced intervals as said planter is driven along, means adapted releasably to hold said mechanism in operative engagement with driven parts of said planter, mechanism adapted automatically to measure the distance traveled as said planter is driven along, means adapted releasably to hold said mechanism in operative engagement with driven parts of said planter, and mechanism operatively connected to said last-named means adapted to operate same, said mechanism including a movable member adapted releasably to engage a driven part of said seed-planting mechanism, a slidable member borne by said movable member and means adapted for locking said slidable member releasably in position to lock said measuring mechanism in operative engagement with said driven parts.

10. A seed planter comprising mechanism adapted for automatically planting seed at spaced intervals as said planter is driven along, means adapted releasably to hold said mechanism in operative engagement with driven parts of said planter, mechanism adapted automatically to measure the distance traveled as said planter is driven along, means adapted releasably to hold said mechanism in operative engagement with driven parts of said planter, and mechanism operatively connected to said last-named means adapted to operate same, said mechanism including a movable member adapted releasably to engage a driven part of said seed-planting mechanism, a slidable member borne by said movable member, means adapted for locking said slidable member releasably in position to lock said measuring-mechanism in operative engagement with said driven parts, and means adapted for restoring said last-named mechanism to initial position to disengage said measuring mechanism from operative engagement with said driven parts.

11. A seed planter comprising mechanism adapted for automatically planting seed at spaced intervals as said planter is driven along, means adapted releasably to hold said mechanism in operative engagement with driven parts of said planter, mechanism adapted automatically to measure the distance traveled as said planter is driven along, means adapted releasably to hold said measuring mechanism in operative engagement with driven parts of said planter, and mechanism operatively connected to said last-named means adapted to operate same, said operating mechanism including a slidable member and a movable member borne by said slidable member and adapted releasably to engage driven parts of said seed-planting mechanism.

12. A seed planter comprising mechanism for automatically planting seed at spaced intervals as said planter is driven along, means adapted releasably to hold said mechanism in operative engagement with driven parts of said planter, mechanism adapted automatically to measure the distance traveled as said planter is driven along, means for releasably holding said mechanism in operative engagement with driven parts of said planter, said means being adapted releasably to be adjusted to position in operative engagement with driven parts of said seed-planting mechanism, said measuring-mechanism including rotatable scaled means adapted to rotate with the rotation of the carriage wheels of the planter when said last-named mechanism is in operative engagement with said driven parts.

In testimony whereof I hereunto affix my signature.

ALFRED SCHAEFFER.

Copies of this patent may be obtained for five cents each, by addressing the "Commissioner of Patents, Washington, D. C."